Nov. 10, 1970  E. VATTER  3,539,916
MAGNETIC FIELD DIRECTION SENSING MEANS UTILIZING
MAGNETO-RESISTORS MOUNTED IN A ROTATABLE CARRIER
Filed March 7, 1968  3 Sheets-Sheet 1

INVENTOR:
ERNST VATTER

By Kurt Kelman
AGENT

INVENTOR:
ERNST VATTER
By Kurt Kelman
AGENT

United States Patent Office 3,539,916
Patented Nov. 10, 1970

1

3,539,916
MAGNETIC FIELD DIRECTION SENSING MEANS UTILIZING MAGNETO-RESISTORS MOUNTED IN A ROTATABLE CARRIER
Ernst Vatter, Otto Beckstrasse 27,
Mannheim, Germany
Filed Mar. 7, 1968, Ser. No. 711,330
Claims priority, application Germany, Mar. 8, 1967
V 33,192
Int. Cl. G01r 33/02
U.S. Cl. 324—46
2 Claims

ABSTRACT OF THE DISCLOSURE

A compass includes a universally mounted magnetic circuit constituted by a non-magnetic and a magnetic yoke, the two yokes being interconnected by two magnetic legs which include a permanent magnet. A magneto-resistor is arranged in an air gap in the magnetic yoke for measuring the magnetic flow in the circuit, and an electrical measuring bridge is connected to the resistor.

BACKGROUND AND SUMMARY OF THE INVENTION

The present invention relates to improvements in instruments for indicating the position of an object relative to a magnetic field.

It is the primary object of this invention to increase the accuracy of measurement of such instruments, particularly for use in measuring the position of a craft in the terrestrial magnetic field, in space navigation and the like.

The above and other objects are accomplished in accordance with the invention by mounting magnetic means for rotation about at least two different axes, such means producing two magnetic circuits arranged in one plane. The circuits have magnetic flow legs adjacent and parallel to each other, and the magnetic flow in these legs extending in the same direction. Each magnetic flow leg defines an air gap, and an electrical resistance is arranged in each air gap. The resistances form part of an electric measuring bridge.

According to a specific embodiment, the magnetic means is mounted on a carrier body which is mounted for rotation on a first horizontal axis, a vertical axis perpendicular thereto, and a second horizontal axis perpendicular to the first horizontal axis.

BRIEF DESCRIPTION OF THE DRAWING

The above and other objects, advantages and features of the present invention will become more apparent in the following detailed description of a now preferred embodiment, taken in conjunction with the accompanying drawing wherein.

DETAILED DESCRIPTION

Figure 1:
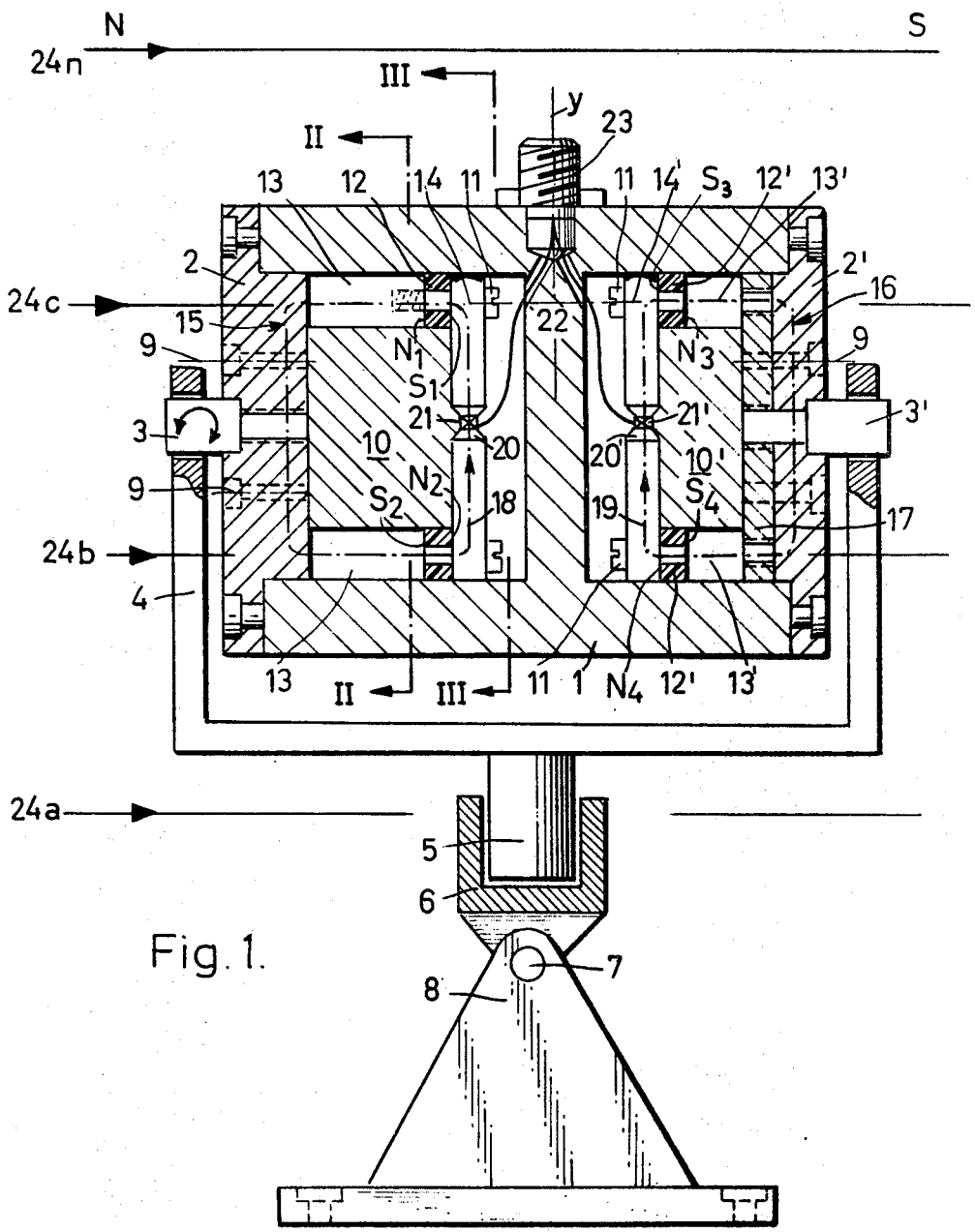
FIG. 1 is a vertical section showing the directional indicating instrument.
Figure 2:
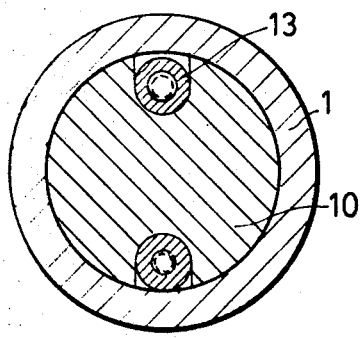
FIGS. 2 and 3 are, respectively, sections along lines II—II and III—III of FIG. 1.
Figure 3:
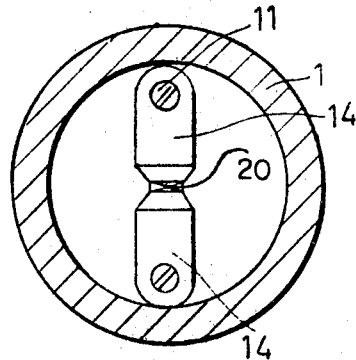

The carrier body for the instrument is shown to include a cylindrical housing 1 whose two open ends are

2 covered by covers 2, 2', housing and covers consisting of non-magnetic material. Sub shafts 3, 3' extend outwardly from the covers and are rotatably journaled in frame 4 so that the instrument is rotatable about a first horizontal axis defined by the stub shafts. Frame 4 has a vertical pivot 5 which is rotatably journaled in sleeve bearing 6, thus making the instrument rotatable about a vertical axis defined by the pivot and perpendicular to the first horizontal axis. Furthermore, the sleeve bearing is rotatable mounted by an axle 7 in a fixed stand 8 whereby the instrument is rotatable about a second horizontal axis defined by axle 7 and perpendicular to the first horizontal axis.

A pair of packing bodies 10, 10' are fixed to the inside of covers 2, 2' by means of bolts 9, the packing bodies filling a substantial portion of the chamber defined by housing 1. Magnetic means producing two magnetic circuits are arranged in one plane in this chamber. The magnetic circuit 15 is formed by the two magnetic yokes 14 defining air gap 20 therebetween and the two magnetic legs 13 extending at opposite sides of packing body 10 from the magnetic yokes, the permanent magnets 12 being adjacent the magnetic yokes. The magnetic circuit 16 is formed by two magnetic yokes 14' defining air gap 20' therebetween and the two magnetic legs 13' extending at opposite sides of packing body 10' from the magnetic yokes, the permanent magnets 12' being adjacent the magnetic yokes and the plate 17 being adjacent cover 2'. Parts 13, 13', 14, 14' and 17 are of magnetic material, the magnetic yokes of the circuits constituting magnetic flow legs adjacent and parallel to each other, and as indicated by arrows 18 and 19, the magnetic flow in these legs extending in the same direction. Bolts 11 are used to attach the magnetic means the covers 2, 2'.

Magneto-resistors 21, 21' are mounted in the air gaps in the magnetic circuits 15 and 16, respectively, the resistances being responsive to changes in the magnetic flux in the circuits. These resistances form part of an electrical measuring bridge, being connected by electric conductors 22 to a socket 23 mounted on the outside wall of housing 1 for connection to the measuring circuit.

As shown, the permanent magnets 12, 12' are so arranged that the same poles of the pair of magnets are opposite each other, i.e. south poles $S_1$, $S_3$ of magnet 12 and of magnet 12' face each other, with the north poles $N_2$, $N_4$ of the two permanent magnets also facing each other.

Figure 4:
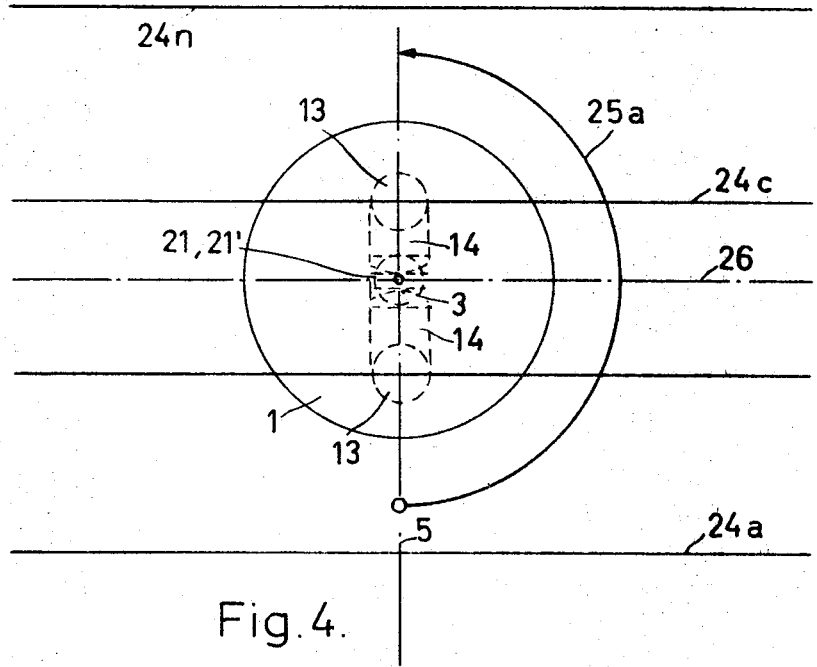
FIG. 4 is a side view showing the operation of the instrument, the instrument being shown only schematically.

The terrestrial magnetic field is indicated by equipotential lines 24a, 24b, 24c, . . . 24n which are the section lines of a succession of magnetic field planes extending perpendicularly to the plane of the drawing. Each of the magnetic field planes encircles the earth on which the instrument stands, the magnetic density of succeeding planes decreasing proportionally to the distance of the plane from the surface of the earth so that the magnetic density of the field indicated by equipotential line 24a is the greatest while that of line 24n is the smallest. As shown in FIGS 1 and 4, the magnetic density or field strength in the plane represented by equipotential line 24b is greater than that represented by line 24c so that the field strength of the terrestrial magnetic field and the corresponding magnetic induction is stronger in the lower leg of the magnetic circuit 15 than in the upper leg thereof, the respective magnetic field planes passing through the centers of the legs 13 and the permanent magnets 12 attached thereto. FIG. 1 shows the field direction of the equipotential line 24b to be the same as that of magnetic circuit 15 and opposite to that of magnetic circuit 16. Therefore the north polarity in the lower leg of circuit 15 is increased while it is weakened in magnetic circuit 16. The opposite effect is achieved by line 24c passing through the centers of the upper magnetic circuit legs and permanent magnets. These two effects balance each other, due to the homogeneity of the terrestrial magnetic field, so that the instrument produces no signal in the position shown in FIG. 1. Since the magneto-resistors 21, 21' remains in the same magnetic field plane when instrument is turned about vertical pivot 5, no signal is produced during such rotation, either.

FIG. 4 shows the instrument in a side view taken in the direction of the axis passing through stub shafts 3, 3'. When the instrument is turned about this axis in the direction of arc 25 until the magnetic yokes 14 of the magnetic circuits lie in plane 26, i.e. by 90°, the magnetic circuits continuously pass through successive magnetic field planes, the potential difference between the upper and lower legs of the circuits gradually decreasing to zero when both legs of the magnetic circuit lie in the same magnetic field plane 26. The electrical resistance probes 21, 21' register this change in the magnetic flow.

Figure 5:
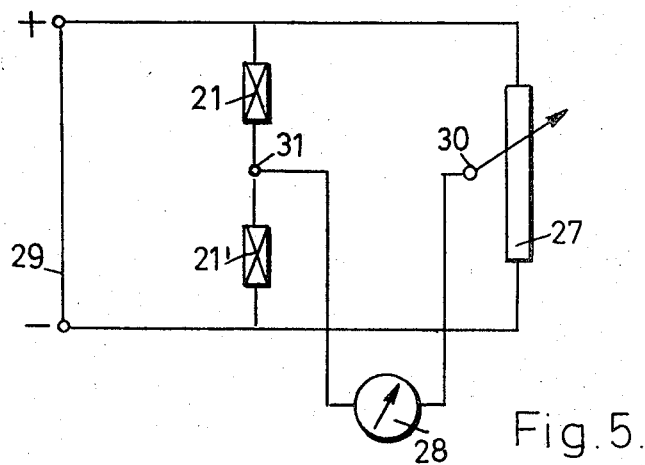
FIG. 5 shows the measuring bridge of the instrument.

FIG. 5 illustrates the circuit diagram of the measuring bridge of which the probes 21, 21' are a part. Electrical measuring bridges of this type are well known, the resistances being in circuit with an adjustable potentiometer under a given potential 29. A meter 28 is mounted in the circuit to indicate the signal produced by the resistances during rotation of the instrument.

Referring to the operation shown in FIG. 4, the bridge point 30 would tend from the negative side towards the zero point, which is reached when the magnetic circuit legs 13, 13' come to rest in plane 26, at which stage the potential difference is zero. When rotation of the instrument along arc 25a is continued, the bridge point 31 will move into the positive range. Continued rotation along the other semi-circular arc portion will change the signal from maximum positive to maximum negative. The maximum positive reading will be produced at the point where the instrument has been turned 180° from the position shown in FIG. 4. Thus, one angle measurement can be effected with the instrument by turning it about the first horizontal axis defined by stub shafts 3, 3'.

Figure 6:
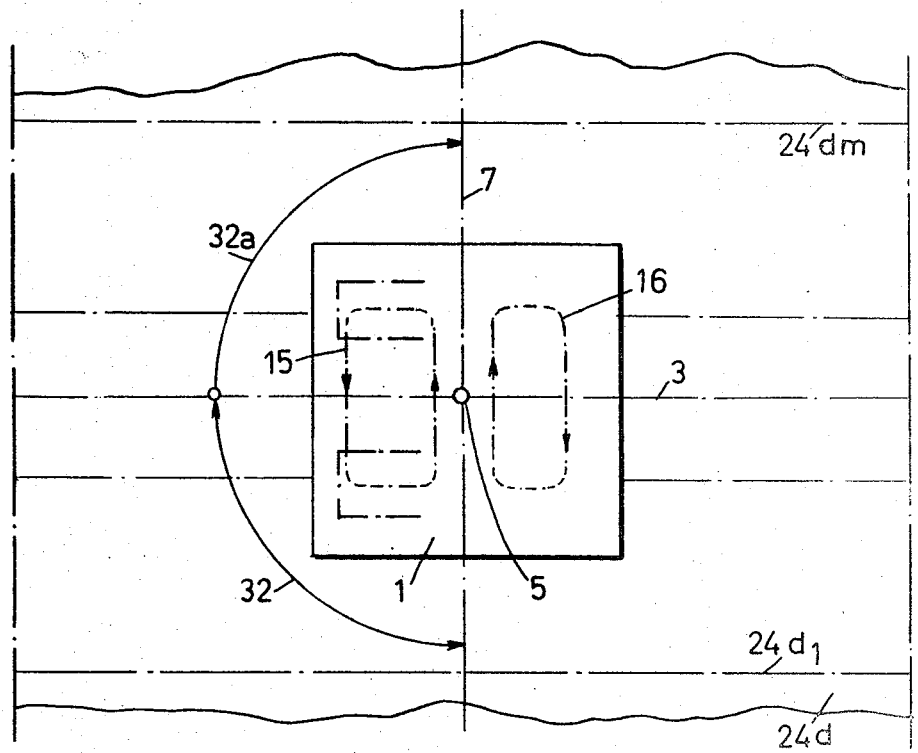
FIG. 6 is a top view showing the instrument turned 90° about one horizontal axis, the instrument being shown only schematically.

FIG. 6 shows the instrument schematically as viewed in the direction of the vertical axis passing through pivot 5, which is perpendicular to the first horizontal axis. In this view, the magnetic circuits 15, 16 lie in the vertical magnetic field plane 24d (which is the plane of the drawing). When the instrument is turned about the vertical axis in the direction of arc 32, the magneitc circuits again pass through successive magnetic field planes, i.e. the planes of longitude of the terrestrial magnetic field, indicated by lines $24d_1 \ldots 24d_m$. As explained in connection with FIG. 4, this turning of the instrument causes potential change which are measured by the resistances 21, 21', turning in the direction of arc 32 producing the positive maximum while further turning along arc 32a produces the negative maximum In the position illustrated in FIG. 6, the reading will be zero, as it will be at a position 180° removed therefrom. Nor would a reading be obtained if the instrument were turned about the second horizontal axis defined by axle 7.

An instrument of the described type accurately measures during turning in different planes, it has no moving parts, is simple and economical to construct, and is very sturdy.

While the invention has been described in connection with one embodiment, it will be obvious that many variations and modifications may occur to those skilled in the art, particularly after benefiting from the present teaching, without departing from the spirit and scope of this invention as defined in the appended claims.

I claim:
1. An instrument for indicating the position of a body in the terrestrial magnetic field comprising:
   means rotatably mounting a carrier in said magnetic field about three mutually prependicular axis;
      a first magnetic circuit supported by said carrier and lying in a plane, said magnetic circuit consisting of,
      a pair of alined elongated magnetic yokes whose adjacent ends are separated by an air gap,
      a pair of elongated magnetic legs, each leg extending in the same direction orthogonally from the non-adjacent ends of said yokes, one of the ends of said legs being attached to said non-adjacent ends of said yokes by permanent magnets, the other ends of said legs being interconnected by a member of substantially non-magnetic material, said magnets being so poled that flux flows through said magnetic circuit in one direction,
   and a magneto-resistor means arranged in the air gap for measuring the magnetic flux flow in the magnetic circuit, said magneto-resistor being connected as one leg of an electrical measuring bridge.

2. The instrument of claim 1, further comprising:
   a second magnetic circuit supported by said carrier and lying in the same plane as said first magnetic circuit,
   said second magnetic circuit consisting of a pair of elongated yokes, elongated legs, magnets and an interconnecting member such as the first magnetic circuit with the exception that the interconnecting member of the second magnetic circuit is of magnetic material, the elements of the second magnetic circuit being arranged as the mirror image of the first magnetic circuit about a line parallel to the yokes of said first magnetic circuit,
   and a magneto-resistor positioned in the air gap of the second magnetic circuit for measuring the magnetic flux flow in the second magnetic circuit, said magneto-resistor being connected as a second leg of said electrical bridge circuit.

References Cited

UNITED STATES PATENTS

| | | | |
|---|---|---|---|
| 2,204,292 | 6/1940 | Barth | 324—43 |
| 2,442,732 | 6/1948 | Rubenstein | 33—222 |
| 2,941,163 | 6/1960 | Hess Jr. | 324—46 |
| 3,260,932 | 7/1966 | Weiss et al. | 324—46 |

OTHER REFERENCES

Ross et al., The Hall Effect Compass; Journal of Scien. Instruments; vol. 34, December 1957, pp. 479–484.

RUDOLPH V. ROLINEC, Primary Examiner

R. J. CORCORAN, Assistant Examiner

U.S. Cl. X.R.

33—204